United States Patent [19]
Frantz et al.

[11] Patent Number: 5,211,422
[45] Date of Patent: May 18, 1993

[54] OCCUPANT RESTRAINT SYSTEM

[75] Inventors: Brian H. Frantz, Royal Oak; Jack L. Jensen, Highland; Gregory A. Miller, Troy, all of Mich.

[73] Assignee: General Motors Corporation, Detroit, Mich.

[21] Appl. No.: 752,133

[22] Filed: Aug. 29, 1991

[51] Int. Cl.⁵ .................. B60R 21/20; B60R 21/26
[52] U.S. Cl. ............................. 280/740; 280/742; 280/731; 280/743
[58] Field of Search ............ 280/728, 743, 736, 740, 280/742, 730, 731

[56] References Cited

U.S. PATENT DOCUMENTS

| | | | |
|---|---|---|---|
| 3,827,715 | 8/1974 | Lynch | 280/731 |
| 4,013,305 | 3/1977 | Ichihara | 280/740 |
| 4,903,986 | 2/1990 | Cok et al. | 280/743 |
| 5,009,452 | 4/1991 | Miller | 280/731 |

FOREIGN PATENT DOCUMENTS 0136945 6/1991 Japan ..................... 280/728

*Primary Examiner*—Charles A. Marmor
*Assistant Examiner*—Tamara L. Graysay
*Attorney, Agent, or Firm*—Charles E. Leahy

[57] ABSTRACT

An occupant restraint system includes a folded cushion having an upper wall portion against which is seated a reaction member mounted to the support plate of the system by a strap. The periphery of the reaction member is sealed or pocketed to the upper wall portion by (1) flaps sewn to the upper wall portion and overlying the periphery of the reaction member; or, (2) a sheet of flexible material sewn to the upper wall portion and having tear lines so as to separate into flaps. Both the flaps and sheet of flexible material are sandwiched to the reaction member by a retainer member secured thereto.

11 Claims, 4 Drawing Sheets

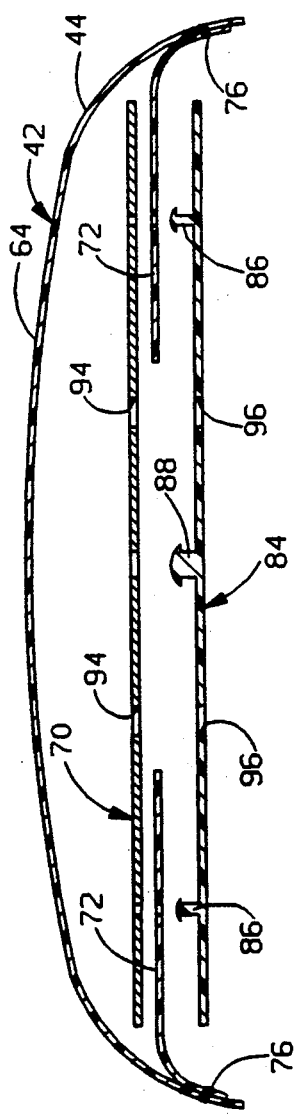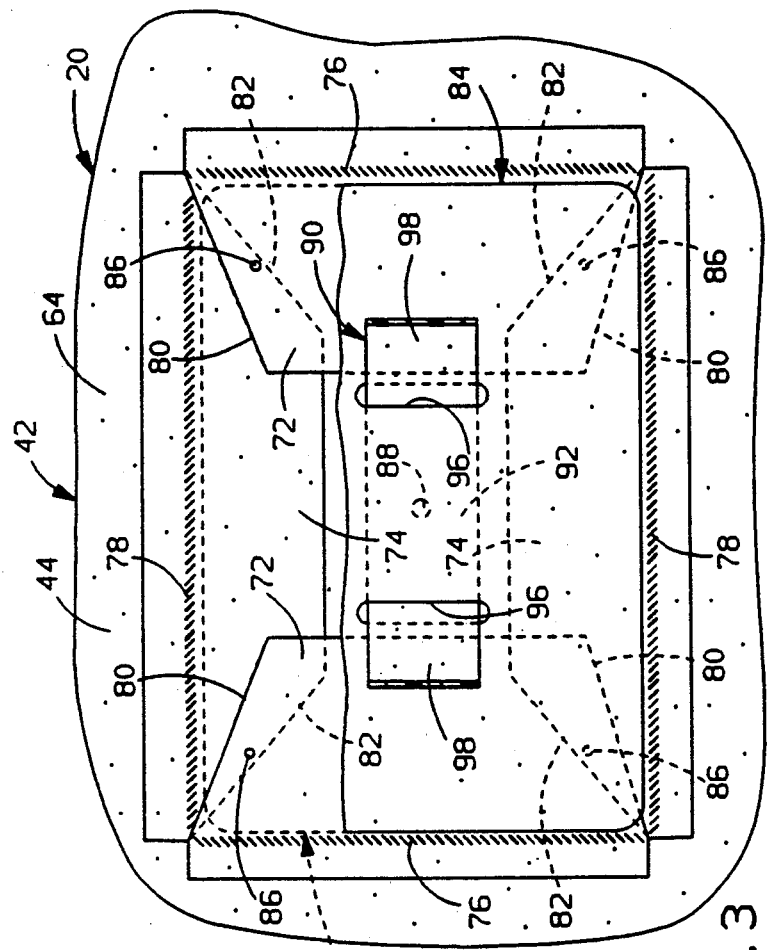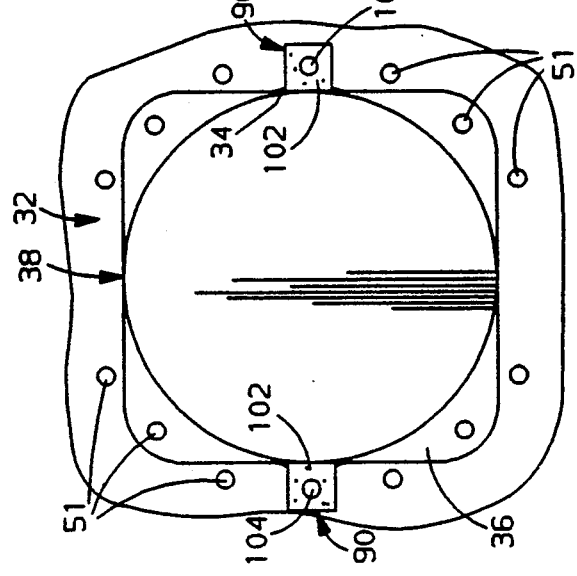

OCCUPANT RESTRAINT SYSTEM

BACKGROUND OF THE INVENTION

This invention relates to occupant restraint systems and more particularly to occupant restraint systems of the type which releasably secure the cushion against initial deployment normal to or toward the occupant and direct such initial deployment laterally of the occupant U.S. Pat. No. 5,009,452, Occupant Restraint System, issued Apr. 23, 1991 to Gregory A. Miller and assigned to the assignee of this invention, discloses an occupant restraint system which includes a reaction member mounted to the support of the restraint module and located above the inflator of an occupant restraint system. The reaction member is sealed to the upper wall portion of the occupant restraint cushion to prevent the impingement of pressure fluid from the inflator against such upper wall portion during initial deployment of the cushion and thereby restrict such initial deployment laterally of the occupant through the unfolding of the folded side and end walls of the cushion.

This invention provides an occupant restraint system having a reaction member of the type disclosed in the Miller patent and having additional features.

One of the features of the occupant restraint system of this invention is that the reaction member is mounted to the support by a flexible strap or mounting member having a bight which loops through a pair of spaced slots or openings located in the center area of the reaction member. The legs of the strap pass around the inflator and downwardly through the inflator receiving opening of the support to the underside thereof. The ends of the legs are doubled over and secured to the underside of the support. If, desired the legs need not be secured to the support since the doubled over ends prevent the ends of the legs from being pulled upwardly of the support between the inflator and the inflator receiving opening of the support. By mounting the reaction member to the support by a flexible strap, the size of the inflator module can be reduced since the folded end walls of the cushion can be moved inward toward the inflator and occupy the space otherwise occupied by the supports for the reaction member in the Miller patent. Additionally, the mounting member permits the reaction member to shift or move slightly relative to the support and inflator if required.

Another feature is that the reaction member is pocketed to the inside of the upper wall portion of the cushion to seal the interface between the reaction member and such upper wall portion of the cushion. In one embodiment of the invention, the pocketing includes flaps of flexible material, such as the same material as the cushion, which are sewn or otherwise secured to the inside of the upper wall portion of the cushion adjacent the periphery of the reaction member and overlap or overlie such periphery. The flaps are of truncated triangular shape to leave the center area of the reaction member uncovered and not interfere with the passage of the strap therethrough. The side edge portions of the flaps overlie or overlap each other. The flaps are releasably secured to the reaction member by a retainer member which sandwiches the flaps to the reaction member. The retainer member is centrally secured to the reaction member and releasably secures the flaps to the reaction member by shearable fasteners which extend through the overlapping side edge portions of the flaps. The retainer member is provided with slots or openings in general alignment with those of the reaction member so that the bight of the mounting member can extend therethrough. In another embodiment of the invention, the pocketing includes a sheet of flexible material of the same general shape as the reaction member but slightly larger. The edge portions of the sheet are sewn or otherwise secured to the inside of the upper wall portion of the cushion adjacent the periphery of the reaction member. The center area of the sheet of flexible material is open and slits, perforations, or other types of tear lines extend diagonally from such center opening toward the corner portions of the sheet of flexible material. The slits, perforations, or other types of tear lines terminate slightly short of the corner portions of the reaction member so that the sheet of flexible material pockets the reaction member to the upper wall portion of the cushion. This embodiment also includes a retainer member centrally secured to the reaction member and sandwiching the sheet of flexible material to the reaction member. However, there is no need for the retainer member to include any shearable fastening means for releasably securing the sheet of flexible material to the reaction member.

When the folded undeployed cushion initially receives pressure fluid from the inflator, the initial deployment of the cushion is laterally of the occupant as the folded side and end walls of the cushion unfold. The pocketing of the reaction member to the upper wall portion of the cushion by the flaps or sheet of flexible material seals the interface between the reaction member and such upper wall portion of the cushion and prevents the entry of the pressure fluid therebetween. Thus, the upper wall portion of the cushion remains generally stationary and does not move toward the occupant during initial deployment of the cushion. As the pressure fluid continues to fill the cushion, the side and end walls unfold into continuations of the pocketed and sealed upper wall portion. When the pressure and volume of the pressure fluid reach certain levels, the pocket is ruptured by (1) the flaps being pulled from between the retainer member and reaction member as the shearable fasteners shear, or (2) the sheet of flexible material tearing or rupturing along the tear lines into flaps connected at the corner portions of such sheet, to permit the flaps to move with the upper wall of the cushion toward the occupant. The flexible mounting member retains the reaction member and retainer member in place. Since the flaps are formed of flexible material, the occupant cannot feel or engage the flaps through the cushion should the occupant engage the outer side of the upper wall of the cushion.

These and other features of the invention will be readily apparent from the following specification and drawings wherein:

FIG. 2 is an exploded view of a portion of FIG. 1.

FIG. 3 is a view taken along line 3—3 of FIG. 1.

FIG. 7 is a view along line 7—7 of FIG. 1.

Figure 1:
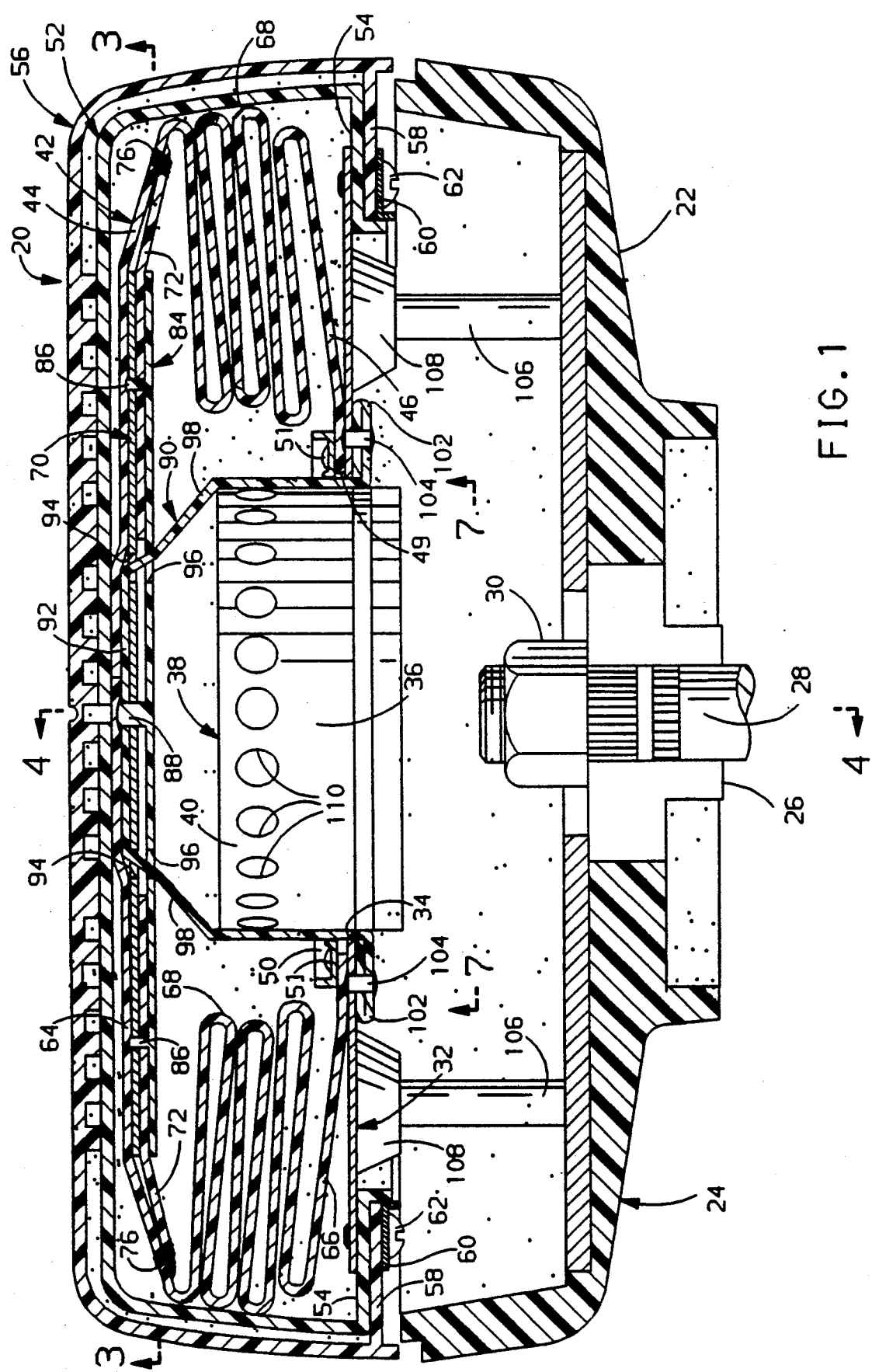
FIG. 1 is a section view of an occupant restraint system according to this invention.

Referring now to FIG. 1 of the drawings, an occupant restraint system 20 according to this invention is shown mounted to the hub portion 22 of a vehicle steering wheel 24. The hub portion includes a splined bushing 26 which receives the splined upper end of the vehicle steering shaft 28 and is secured thereto at 30 to secure the vehicle steering wheel 24 to the vehicle steering system.

Figure 4:
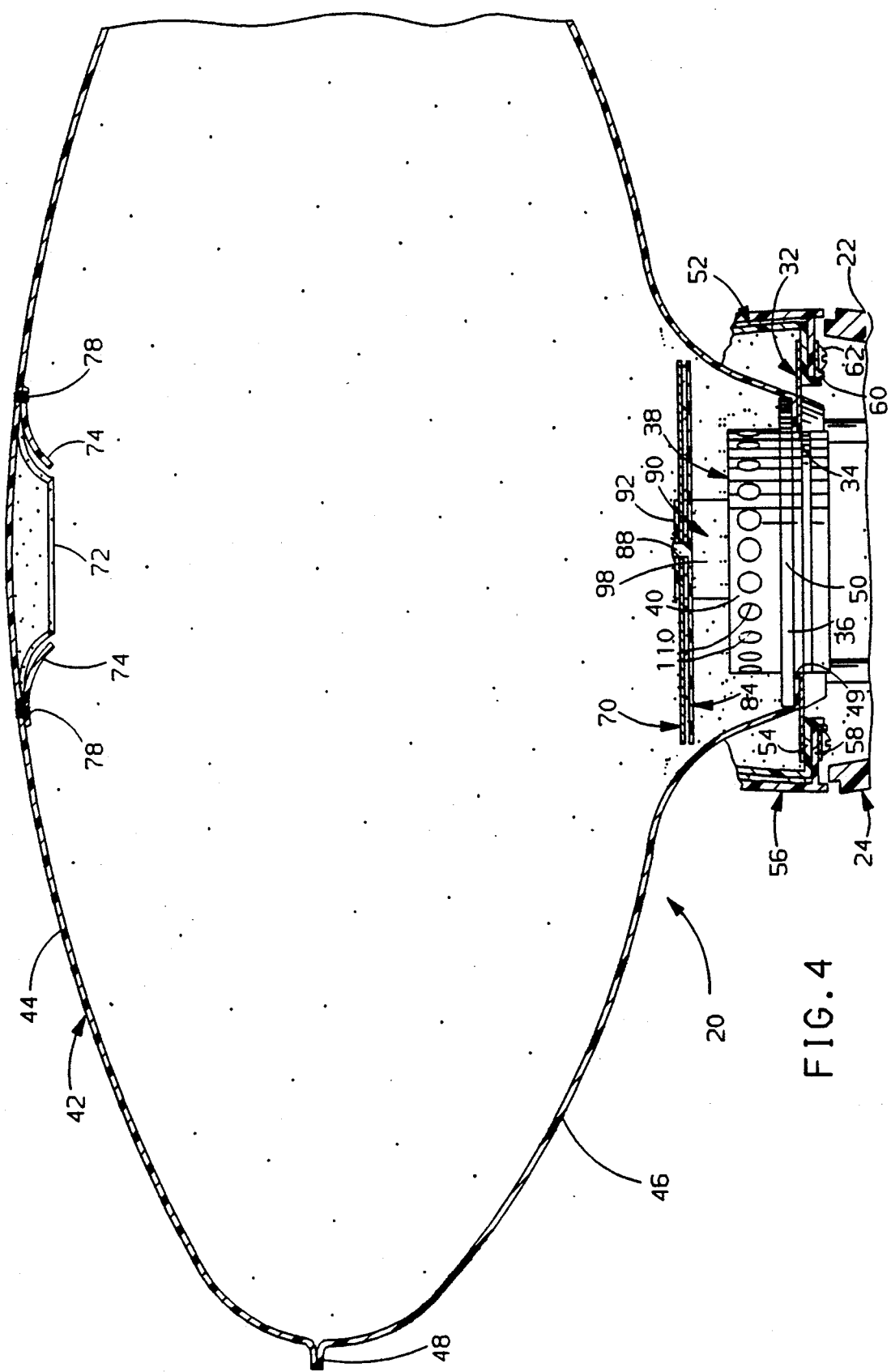
FIG. 4 is a view showing the occupant restraint cushion deployed toward the occupant.

A generally rectangularly shaped plate or support 32 has a central circular opening 34. The segmented flange 36, FIGS. 1 and 7, of a conventional inflator 38 has portions which underlie the lower side of the support 32 around the opening 34. The outlet portion 40 of the inflator projects within the interior of a folded occupant restraint cushion 42. The cushion 42 includes upper and lower or forward and rearward circular members 44 and 46 which are secured together at their circular edge portions 48, FIG. 4. The upper or forward cushion member 44 provides the impact surface engaged by the driver when the cushion is inflated. The lower or rearward cushion member 46 has a central opening 49, the edge portion of which is located underneath a retainer 50. Spaced fasteners 51 secure the segments of the flange 36, the edge portion of the opening 49, and retainer 50 to the support 32.

The inflator 38 is a conventional gas generator which is actuated to produce gas or pressure fluid when a suitable sensor, either acceleration or velocity or otherwise, senses an actual or impending impact of the vehicle with an obstacle and sends an appropriate signal to the inflator.

A container 52 for the cushion 42 is formed of plastic material and has a generally box-like rectangular shape. The container houses the folded occupant restraint cushion 42 and has a segmented flange 54 which underlies the support 32. An outer decorative cover 56 of plastic material is of the same general shape as the container 52. The cover 56 has a segmented flange 58 which overlies the flange 54 of the container. A retainer 60 overlies the flanges 54 and 58 and is secured at 62 to the support 32 to secure the container and cover to the support 32.

The cover 56 and container 52 have respective molded in lines and molded in perforations so as to separate in pairs of flaps during deployment of the cushion. Reference may be had to U.S. Pat. No. 4,903,986 Cok et al, Occupant Restraint System, issued Feb. 27, 1990 for the details of the cover and container as well as the manner in which the members 44 and 46 of the cushion 42 are folded to provide a generally rectangularly shaped upper wall portion 64, a lower wall portion 66, fan folded side wall portions, not shown, and pleat folded end wall portions 68, FIG. 1.

A generally rectangularly shaped reaction plate or member 70 is of the general size of the upper wall portion 64 and seats thereagainst. As shown in FIGS. 2 and 3, in one embodiment of this invention, pairs of flaps 72 and 74 are respectively secured at 76 and 78 to the inside of the upper wall portion 64 of the cushion adjacent the shorter or end edges and the longer or side edges of the reaction member 70. As best shown in FIG. 3, the flaps are of generally truncated triangular shape and the side edge portions 80 and 82 of the flaps 72 and 74, respectively, overlap. The flaps 72 and 74 are sandwiched between the reaction member 70 and a retainer plate or member 84 which is of the same general size as the reaction member 70. The retainer member may be formed of plastic as indicated and include a number of integral headed fasteners 86, FIG. 2, which extend through the overlapped side edge portions 80 and 82 of the flaps 72 and 74 and are received in openings of the reaction member 70. The reaction member 70 and retainer member 84 are additionally centrally secured at 88 by a like integral headed fastener of the latter received in an opening of the former. Although the retainer member 84 is shown formed of plastic material with integral headed fasteners 86 and 88, the retainer member can be formed of other materials and be secured to the reaction member by other types of fasteners or otherwise.

A flexible member or strap 90 has its bight 92 looped through generally aligned pairs of slots or openings 94 and 96 in the reaction member 70 and retainer member 84, respectively. The legs 98 of the strap 90 pass around the inflator 38 and through the opening 34 and retainer 50 in the support 32 to the underside of the support. The ends of the legs are doubled over at 102 and riveted or otherwise secured at 104 to the underside of the support 32 adjacent the opening 34 therethrough.

From the foregoing, it can be seen that the support 32, inflator 38, cushion 42, container 52, cover 56, reaction member 70, retainer member 84 and strap 90 are assembled together to provide a self contained restraint system module.

The module is assembled in overlying relationship to the opening of the hub portion 22 of the steering wheel by fasteners, not shown, which extend upwardly through openings in the hub portion 22 and into tapped cylindrical tubes or struts 106 which are secured to downward embossments 108 of support 32.

When the inflator 38 receives an appropriate signal, the inflator generates gas or pressure fluid which exits into the interior of the folded cushion 42 through the upper outlet ports 110 of the inflator 38. The pressure fluid initiates unfolding of the fan folded side wall portions and pleat folded end wall portions 68 of the cushion 42 through the separable flaps in the longer or 6 and 12 o'clock side walls and shorter or 3 and 9 o'clock side walls of the container 52 and cover 56 to initiate deployment of the cushion 42 laterally of the occupant, as set forth in the aforenoted Cok et al patent. During this initial deployment of the cushion 42, the upper wall portion 64 of the cushion 42 remains generally stationary since the pairs of flaps 72 and 74 seal the interface between the periphery of the reaction member 70 and such upper wall portion so that the pressure fluid cannot enter through such interface and impinge against the upper wall portion 64. Thus, the upper or forward wall 44 of the cushion does not initially deploy toward the occupant.

As the volume and pressure of the pressure fluid increase, the side wall portions 68 and end wall portions of the cushion continue to unfold into continuations of the sealed upper wall portion 46 of the cushion 42. When such side and end wall portions are substantially unfolded, they pull the pairs of flaps 72 and 74 from between the reaction member 70 and the retainer member 84 as the integral fasteners 86 shear from the retainer member The forward or upper wall 44 of the cushion is then free to deploy with the flaps 72 and 74 normal to or toward the occupant.

The pairs of flaps 72 and 74 move with the upper or forward wall 44 of the cushion 42 normal to or toward the occupant while the reaction member 70 and retainer member 84 are retained against movement by the strap 90. Should the occupant engage the wall 44 of the deployed cushion 42, the occupant will not feel or engage the flaps 72 and 74 since they are within the cushion 42 and are formed of flexible material.

In order to further ensure that none of the pressure fluid enters the space between the reaction member 70 and the upper wall portion 46 of the cushion 42, the openings 96 in the retainer member 84 can be sealed to the legs 98 of the strap 90 passing therethrough.

The strap 90 can be formed of a multiple folded over piece of material, such as the material of the cushion 42. Further, the portions of the legs 98 of the strap which pass near the outlets of the inflator 38 can be appropriately coated, such as with a silicone base material, to prevent deterioration of their strength.

Figure 5:
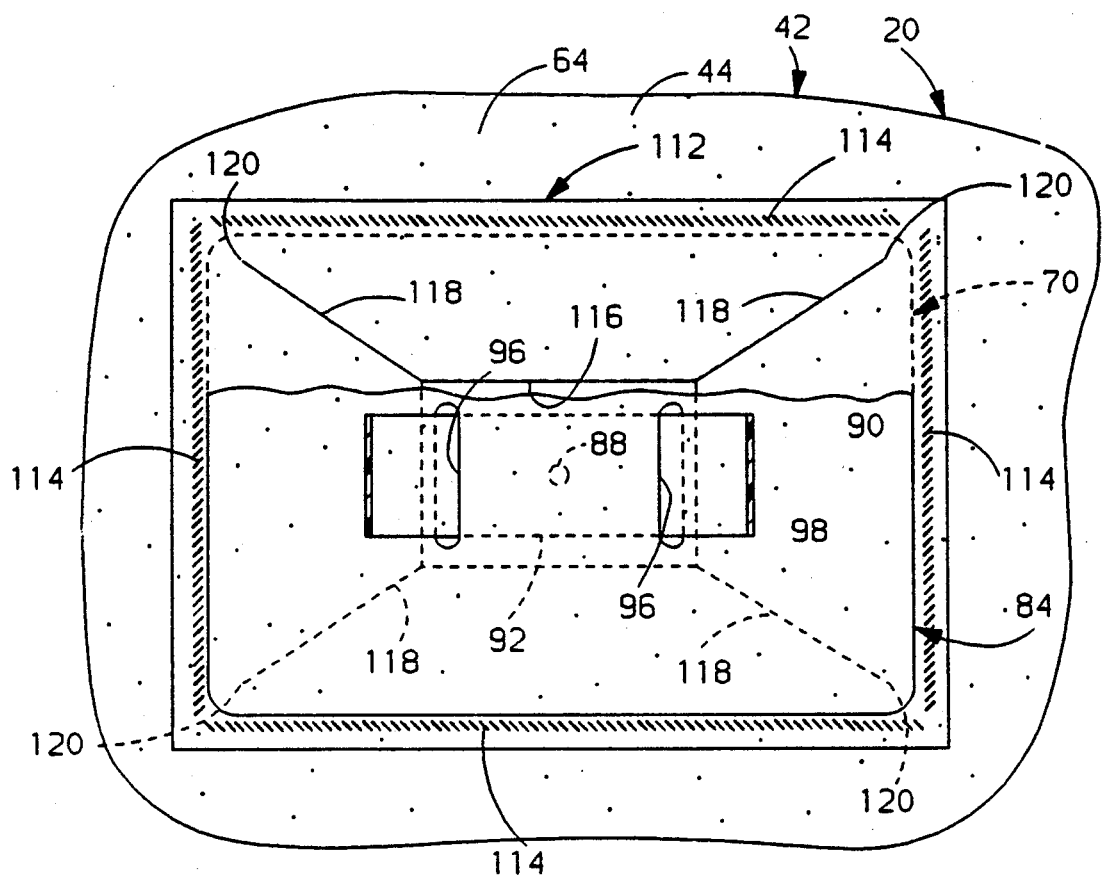
FIG. 5 is a view of an alternate embodiment of the flaps.

An alternate embodiment of this invention is shown in FIG. 5, and like numbers will be used for like parts. In this embodiment, a sheet 112 of flexible material covers or pockets the reaction member 70 and has the edges thereof sewn at 114 to the inside of the upper wall portion 64 of the cushion 42. The center area 116 of the sheet of flexible material 112 is open so as to not interfere with the strap 90. A series of tear lines 118 which extend diagonally from the corners of the center area 116 toward the corner portions of the sheet of flexible material 112. The tear lines may be in the form of slits or perforations or otherwise. It will be noted that the tear lines 118 terminate at 120 short of the corner portions of the sheet of flexible material 112 so that the reaction member 70 is pocketed within the sheet 112. As in the first embodiment, a retainer member 84 sandwiches the sheet of flexible material 112 to the reaction member 70 and is centrally secured thereto at 88. No shearable fasteners 86 are provided since none are necessary.

This embodiment of the invention operates in the same manner as the first embodiment. Generally, the initial deployment of the cushion is laterally of the occupant as the folded side and end walls unfold into continuations of the upper wall portion 64, which remains stationary due to the sheet of flexible material 112 being sandwiched between the reaction member 70 and the retainer member 84. When the pressure and volume of the pressure fluid reach predetermined levels, the wall portion 64 pulls the sheet of flexible material from between the reaction member 70 and retainer member 84 as the sheet 112 separates into flaps along the tear lines 118 and moves with the wall portion 64 and the remainder of wall 44, provided by the unfolded side and end walls of the cushion 42, normal to or toward the occupant.

Figure 6:
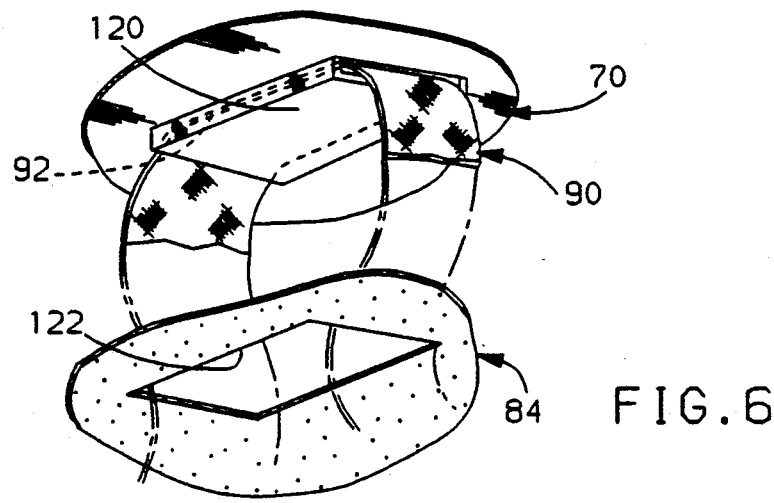
FIG. 6 is a view of an alternate embodiment of the connection of the strap to the reaction member and retainer member.

Another embodiment of the connection of the strap 90 to the reaction member 70 and retainer member 84 is shown in FIG. 6. In this embodiment, the retainer member 70 is provided with an integral lanced tab or member 120 which is received through a like shaped opening 122 in the retainer member 84. The strap 90 extends through and under that member 120 to mount the sandwich of the reaction member 70 and retainer member 84 to the support 32. The reaction member and retainer member can be additionally secured to each other by shearable fasteners as in the first embodiment of the invention if desired.

Thus, this invention provides an occupant restraint system of the type shown in the aforenoted Miller patent in order to provide for initial deployment of an occupant restraint cushion laterally of an occupant and delayed deployment of the cushion normal to or toward the occupant.

We claim: The embodiments of the invention in which an exclusive property or privilege is claimed are defined as follows:

1. An occupant restraint system comprising, support means, an inflatable occupant restraint cushion including a lower wall portion mounted to the support means, an upper wall portion spaced from the support means, and folded wall portions interconnecting the upper and lower wall portions, means mounting the lower wall portion to the support means, a source of pressure fluid mounted to the support means for supplying pressure fluid to inflate and deploy the occupant restraint cushion, a pressure fluid reaction member covering the inside of the upper wall portion, flexible means interconnecting the reaction member and the support means to mount the reaction member in overlying spaced relationship to the source of pressure fluid, and means pocketing the pressure fluid reaction member to the inside of the upper wall portion of the cushion to seal the interface between the reaction member and upper wall portion against the entry of pressure fluid during initial deployment of the cushion and maintain the upper wall portion stationary as the folded wall portions of the cushion deploy generally laterally of the occupant, the pocketing means being released from the reaction member when predetermined levels of volume and pressure of the pressure fluid are attained to permit the pocketing means and upper wall portion to move normal to or toward the occupant.

2. An occupant restraint system comprising, support means, an inflatable occupant restraint cushion including a lower wall portion mounted to the support means, an upper wall portion spaced from the support means, and folded wall portions interconnecting the upper and lower wall portions, means mounting the lower wall portion to the support means, a source of pressure fluid mounted to the support means for supplying pressure fluid to inflate and deploy the occupant restraint cushion, a pressure fluid reaction member covering the inside of the upper wall portion, flexible strap means interconnecting the reaction member and the support means adjacent the source of pressure fluid to mount the reaction member to the support means in spaced overlying relationship to the source of pressure fluid, and means pocketing the pressure fluid reaction member to the inside of the upper wall portion of the cushion to seal the interface between the reaction member and upper wall portion against the entry of pressure fluid during initial deployment of the cushion and maintain the upper wall portion stationary as the folded wall portions of the cushion deploy generally laterally of the occupant, the pocketing means being released from the reaction member when predetermined levels of volume and pressure of the pressure fluid are attained to permit the pocketing means and upper wall portion to move normal to or toward the occupant.

3. The combination recited in claim 2 wherein the reaction member is a generally rectangularly shaped planar member, and the pocket means is secured to upper wall portion of the cushion adjacent the edges of the reaction member and overlies peripheral area of the reaction member.

4. The combination recited in claim 2 wherein the strap means is secured to inner area of reaction member, and the pocket means pockets the outer peripheral area of the reaction member.

5. An occupant restraint system comprising, support means, an inflatable occupant restraint cushion including a lower wall portion mounted to the support means, an upper wall portion spaced from the support means, and folded wall portions interconnecting the upper and lower wall portions, means mounting the lower wall portion to the support means, a source of pressure fluid mounted to the support means for supplying pressure fluid to inflate and deploy the occupant restraint cushion, a pressure fluid reaction member covering the inside of the upper wall portion, a flexible continuous strap looped through the reaction member and having the ends thereof mounted to the support means to flexibly mount the reaction member to the support means in overlying spaced relationship to the source of pressure fluid, and means pocketing the pressure fluid reaction member to the inside of the upper wall portion of the cushion to seal the interface between the reaction member and upper wall portion against the entry of pressure fluid during initial deployment of the cushion and maintain the upper wall portion stationary as the folded wall portions of the cushion deploy generally laterally of the occupant, the pocketing means being released from the reaction member when predetermined levels of volume and pressure of the pressure fluid are attained to permit the pocketing means and upper wall portion to move normal to or toward the occupant.

6. The combination recited in claim 5 wherein the strap comprises a multiple ply strap of flexible material.

7. An occupant restraint system comprising, support means, an inflatable occupant restraint cushion including a lower wall portion mounted to the support means, an upper wall portion spaced from the support means, and folded wall portions interconnecting the upper and lower wall portions, means mounting the lower wall portion to the support means, a source of pressure fluid mounted to the support means for supplying pressure fluid to inflate and deploy the occupant restraint cushion, a generally planar pressure fluid reaction member covering the inside of the upper wall portion, flexible means interconnecting the inner portion of the reaction member and the support means to mount the reaction member in overlying spaced relationship to the source of pressure fluid, and means pocketing the outer peripheral area of the pressure fluid reaction member to the inside of the upper wall portion of the cushion to seal the interface between the reaction member and upper wall portion against the entry of pressure fluid during initial deployment of the cushion and maintain the upper wall portion stationary as the folded wall portions of the cushion deploy generally laterally of the occupant, the pocketing means being released from the reaction member when predetermined levels of volume and pressure of the pressure fluid are attained to permit the pocketing means and upper wall portion to move normal to or toward the occupant.

8. An occupant restraint system comprising, support means, an inflatable occupant restraint cushion including a lower wall portion mounted to the support means, an upper wall portion spaced from the support means, and folded wall portions interconnecting the upper and lower wall portions, means mounting the lower wall portion to the support means, a source of pressure fluid mounted to the support means for supplying pressure fluid to inflate and deploy the occupant restraint cushion, a pressure fluid reaction member covering the inside of the upper wall portion, flexible means interconnecting the reaction member and the support means to mount the reaction member in overlying spaced relationship to the source of pressure fluid, flap means secured to the inside of the upper wall portion and overlying the peripheral area of the reaction member to seal the interface between the reaction member and the upper wall portion of the cushion, against the entry of pressure fluid during initial deployment of the cushion and maintain the upper wall portion stationary as the folded wall portions of the cushion deploy generally laterally of the occupant, and means releasably securing the flap means to the reaction member until the pressure and volume of pressure fluid within the cushion attain predetermined levels, the pocketing means being released from the reaction member when such predetermined levels of volume and pressure of the pressure fluid are attained to permit the pocketing means and upper wall portion to move normal to or toward the occupant.

9. The combination recited in claim 8 wherein the flap means comprise a series of individual flap members of generally truncated angular shape having their bases secured to the inside of the upper wall portion and overlying the outer peripheral area of the reaction member.

10. The combination recited in claim 8 wherein the flap means comprise a sheet of flexible material secured to the inside of the upper wall portion adjacent edge portions of reaction member and overlying such edge portions of reaction member and overlying such edge portions and the outer peripheral area of the reaction member, the sheet of flexible material including tear lines to separate the sheet of flexible material into a series of flap members.

11. The combination recited in claim 8 wherein the flap means are sewn to the inside of the upper wall portion of the cushion adjacent the periphery of the reaction member.

* * * * *